(12) United States Patent
Galaton et al.

(10) Patent No.: US 7,144,926 B2
(45) Date of Patent: Dec. 5, 2006

(54) BLOWING AGENT BLENDS

(75) Inventors: Steve M. Galaton, Doylestown, PA (US); Christopher Bertelo, Doylestown, PA (US)

(73) Assignee: Arkema Inc., Philadelphia, PA (US)

( * ) Notice: Subject to any disclaimer, the term of this patent is extended or adjusted under 35 U.S.C. 154(b) by 129 days.

(21) Appl. No.: 10/396,747

(22) Filed: Mar. 25, 2003

(65) Prior Publication Data

US 2004/0132632 A1   Jul. 8, 2004

(51) Int. Cl.
*C08J 9/14* (2006.01)

(52) U.S. Cl. .................. 521/131; 252/67; 252/364; 510/408; 510/412; 510/415; 510/470; 516/12; 521/155; 521/170

(58) Field of Classification Search .......... 252/67, 252/364; 516/12; 510/408, 412, 415, 470; 521/155, 170, 131
See application file for complete search history.

(56) References Cited

U.S. PATENT DOCUMENTS

| | | | |
|---|---|---|---|
| 4,024,090 A * | 5/1977 | VON Bonin et al. ....... 521/110 |
| 5,126,067 A | 6/1992 | Swan et al. .................. 252/171 |
| 5,194,170 A | 3/1993 | Merchant et al. |
| 5,196,137 A | 3/1993 | Merchant |
| 5,478,492 A * | 12/1995 | Barthelemy et al. ........ 510/177 |
| 6,455,601 B1 * | 9/2002 | Singh et al. ................. 521/131 |
| 6,746,998 B1 * | 6/2004 | Fitzgerald ................... 510/410 |
| 6,790,820 B1 * | 9/2004 | Bogdan et al. ............. 510/408 |
| 2003/0141481 A1 * | 7/2003 | Hitters et al. ................. 252/67 |
| 2003/0234380 A1 * | 12/2003 | Knopeck et al. .............. 252/67 |

FOREIGN PATENT DOCUMENTS

| EP | 0527019 | | 4/1999 |
|---|---|---|---|
| WO | WO 99/35209 | * | 7/1999 |

* cited by examiner

Primary Examiner—John M. Cooney, Jr.
(74) Attorney, Agent, or Firm—Steven D. Boyd

(57) ABSTRACT

Foam blowing agent blends containing trans-1,2-dichloroethylene and one or more hydrofluorocarbons are provided, as are foam compositions containing such blends. The resulting foams exhibit dramatic improvement in fire performance.

3 Claims, No Drawings

BLOWING AGENT BLENDS

This application claims the benefit of copending application Ser. No. 10/336,368, filed Jan. 2, 2003.

BACKGROUND OF THE INVENTION

This invention relates to foam blowing agent blends containing trans-1,2-dichloroethylene ("Trans 12") and one or more hydrofluorocarbons ("HFCs"), and to foam compositions containing such blends. Trans 12 is useful to improve the fire performance (that is, to suppress flame spread and smoke generation, as measured by ASTM E 1354 in terms of reduced rate of mass loss and reduced specific extinction area upon ignition) of HFC-blown, closed cell polymer (insulation) foams, such as polystyrene, phenolic and polyurethane foams.

Chlorofluorocarbons ("CFCs") had been used as blowing agents for rigid, closed cell insulation foams for many years because they offer outstanding fire resistance in addition to good thermal insulation, since the CFCs are non-flammable. However, CFCs have been phased out because they are said to be detrimental to the ozone layer. Hydrochlorofluorocarbons ("HCFCs") such as 1,1 -dichloro-1-fluoroethane ("HCFC-141b") with low ozone depletion potential ("ODP") have been alternatives for CFCs. However, HCFCs are also being phased out under the Montreal Protocol. The next generation of foam blowing agents must have zero ODP. For fluorochemical blowing agents, these are generally the HFCs such as 1,1,1,3,3-pentafluorobutane ("HFC-365mfc"). However, HFCs are typically more flammable than the CFCs or HCFCs, so that the new formulations will usually require higher levels of flame retardants in order to achieve the same levels of flammability. This increased level of flame retardant creates a problem because upon burning the flame retardants increase smoke levels. Thus, as disclosed by Albemarle Corporation in its website, Albemarle.com/saytexfr_polyurethane.htm, the addition of a brominated reactive polyol (RB-79) increases the smoke density of foam when subjected to fire tests. It has been reported that the use of 245fa alone will result in foams which generate high smoke density. What is thus needed is a means to achieve satisfactory blowing with HFCs while reducing the amount of fire retardant so as to reduce smoke density and lower overall cost. While Trans 12 has been disclosed as a foam blowing agent, as for example in U.S. Pat. No. 5,126,067, its use to reduce flame spread or smoke density has not been previously disclosed.

BRIEF SUMMARY OF THE INVENTION

An HFC-based foam blowing agent composition is provided, which composition contains Trans 12 in an amount effective to enhance the fire performance of the blown foam, as well as polyurethane foam compositions comprising a polyol, an isocyanate and the blowing agent composition. Preferred HFCs include HFC-365mfc, 1,1,1,3,3-pentafluoropropane ("EHFC-245fa") and 1,1,1,2-tetrafluoroethane ("134a"). Typical Trans 12 levels are from about 5 to 40% by weight, based on the total blowing agent weight.

DETAILED DESCRIPTION

Trans 12 improves the fire performance (suppresses smoke development and mass loss rate) of HFC blown foams, as well as lowering the global warming potential of the blends compared to HFC alone and lowering the overall cost of the foam formulation by reducing the amount of required flame retardant. As noted above, these blends are particularly useful for making closed cell polymer (insulation) foams having improved fire performance, such as polystyrene, phenolic and polyurethane foams.

Trans 12 generally makes up 5–40 weight % of the blends. In the polyurethane foam compositions, the effective concentrations of the blends are typically about 0.1–25 weight % (preferably 0.5–15 weight %), based on the weight of the total polyurethane foam formulation.

The blowing agent can be distributed between the "A" and "B" sides of the foam composition. All or a portion of it can also be added at the time of injection. The Trans 12/HFC blends can also contain additional blowing agents such as water or pentane(s).

The other components of the premix and foam formulations may be those which are conventionally used, which components and their proportions are well known to those skilled in the art. For example, fire retardants, surfactants and polyol are typical components of the B-side, while the A-side is primarily comprised of polyisocyanate. Water is frequently used as a coblowing agent. The A and B sides are typically mixed together, followed by injection of the catalyst, after which the mixture is poured into a mold or box.

The practice of the invention is illustrated in more detail in the following non-limiting examples which compare the performance of HFC-blown foam, using 245fa or 365mfc alone, to the performance of such foams wherein the blowing agent contains 10, 30 or 50 mole % of Trans 12. The formulations used (all having an Iso Index of 275) each contained 156.3 parts D-44V70, a polymeric methane diphenyl diisocyanate (polymeric MDI) available from Bayer Corporation; 100 parts PS2412, a polyester polyol having a hydroxyl number of 230–250 available from the Stepan Company; 0.17 part PC-5, which is pentamethyldiethylenetriamine, a catalyst available from Air Products; 2.71 parts K-15, potassium octoate in dipropylene glycol, a catalyst available from Air Products; 2 parts B-8465, a polysiloxane-polyether copolymer surfactant available from Goldschmidt Chemical Corporation; and about 34–44 parts blowing agent, as more specifically set forth in the table below; all parts are by weight.

The A-side (D-44V70) and B-side (a mixture of the polyol, surfactant and blowing agent) were each cooled to 10° C., then mixed, after which the catalyst mixture was injected. After further mixing for about 15–18 seconds, the mixture was poured into a box. The fire behavior of the foams was tested with a cone calorimeter, according to standard test protocols (ISO 5660 or ASTM E 1354). In this test the foam specimens are ignited with a conical radiant heater, the thermal flux applied on the specimen surface being 50 kilowatts per square meter. The specimens tested had a size of 100 mm by 100 mm with a thickness of 50 mm; they were wrapped in aluminum foil in order to have only the upper surface exposed to the radiant heater. Two specimens were used for each measurement and the results were averaged. The total smoke development in 580 seconds (reported according to ASTM E 1354 as the specific extinction area or "SEA") and the mass loss rate (an indication of the rate of heat release), when calculated between 10 to 90% of weight loss, are reported in the table below:

| Foam ID (with parts of blowing agent) | Mass loss rate (in grams per second per square meter) | SEA (in square meters per kilogram) |
| --- | --- | --- |
| 245 fa only (39.4) | 10 | 852 |
| 245 fa (35.46) + Trans 12 (2.85 or 10 mole %) | 8 | 898 |
| 245 fa (27.58) + Trans 12 (8.56 or 30 mole %) | 4 | 507 |
| 245 fa (19.7) + Trans 12 (14.26 or 50 mole %) | 3 | 585 |
| 365 mfc only (43.51) | 4 | 621 |
| 365 mfc (39.16) + Trans 12 (2.85 or 10 mole %) | 4 | 507 |
| 365 mfc (30.46) + Trans 12 (8.56 or 30 mole %) | 3 | 556 |
| 365 mfc (21.76) + Trans 12 14.26 or 50 mole %) | 3 | 579 |

The improvement with the use of Trans 12 is more dramatic when added to 245fa since the 365mfc by itself produces a less flammable foam than 245fa.

We claim:

1. A polyurethane foam composition comprising an isocyanate, a polyol and as the sole blowing agent a foam blowing agent composition consisting of one hydrofluorocarbon selected from the group consisting of 1,1,1,3,3-pentafluoropropane, and 1,1,1,3,3-pentafluorobutane in combination with trans-1,2-dichloroethylene, said trans-1,2-dichloroethylene present in an amount sufficient to provide enhanced fire performance.

2. The polyurethane foam composition of claim 1 wherein said trans-1,2-dichloroethylene is present in an amount of from about 5–40% by weight of said blowing agent.

3. The polyurethane foam of claim 1 wherein said enhanced fire performance is a mass loss rate of less than 8 grams per second per square meter and a specific extinction area of less than 621 square meters per kilogram.

* * * * *